(12) United States Patent
Nayar et al.

(10) Patent No.: US 10,193,728 B2
(45) Date of Patent: Jan. 29, 2019

(54) TUNABLE PEAK-TO-AVERAGE POWER RATIO FREQUENCY DIVISION MULTIPLEXING

(71) Applicant: Indian Institute of Technology Delhi, New Delhi (IN)

(72) Inventors: Himanshu Nayar, New Delhi (IN); Vinay Joseph Ribeiro, New Delhi (IN); Ranjan Kumar Mallik, New Delhi (IN)

(73) Assignee: INDIAN INSTITUTE OF TECHNOLOGY DELHI, New Delhi (IN)

( * ) Notice: Subject to any disclaimer, the term of this patent is extended or adjusted under 35 U.S.C. 154(b) by 106 days.

(21) Appl. No.: 14/907,296

(22) PCT Filed: Nov. 16, 2013

(86) PCT No.: PCT/IB2013/060184
§ 371 (c)(1),
(2) Date: Jan. 25, 2016

(87) PCT Pub. No.: WO2015/028851
PCT Pub. Date: Mar. 5, 2015

(65) Prior Publication Data
US 2016/0173310 A1  Jun. 16, 2016

(30) Foreign Application Priority Data
Aug. 24, 2013 (IN) .......................... 2502/DEL/2013

(51) Int. Cl.
*H04L 27/26*    (2006.01)
*H04L 5/00*     (2006.01)
*H04W 72/04*    (2009.01)

(52) U.S. Cl.
CPC ........ *H04L 27/2615* (2013.01); *H04L 5/0007* (2013.01); *H04L 27/2636* (2013.01); *H04W 72/044* (2013.01)

(58) Field of Classification Search
CPC .................................................. H04L 27/2615
See application file for complete search history.

(56) References Cited

U.S. PATENT DOCUMENTS 7,315,580 B2    1/2008  Feng et al.
8,204,150 B2    6/2012  Han et al.
(Continued)

OTHER PUBLICATIONS

"SC-FDMA Single Carrier FDMA in LTE," White Paper by IXI-ACOM, pp. 1-16 (Nov. 2009).
(Continued)

*Primary Examiner* — John D Blanton

(57) ABSTRACT

Technologies are generally provided to enable the peak-to-average power ratio (PAPR) in OFDM communication systems to be adjusted to a particular level. In some examples, an N-symbol transmission vector may be partitioned into k equal partitions, a Fast Fourier Transform (FFT) may be performed on each partition, and an interleaving union of FFT results may be generated. The results of the interleaving union may be used for transmission after mapping them to the M subcarriers and performing an M-point IFFT. On the receiver side, FFT may be performed on M subcarriers, where each of L end user devices may be assigned N subcarriers out of M=N*L available subcarriers. The N subcarriers of the FFT results may be de-mapped and subjected to an interleaving partition. Subsequently, an Inverse FFT (IFFT) may be performed on each partition and results of the IFFT operation employed for symbol detection.

26 Claims, 8 Drawing Sheets

(56) References Cited

U.S. PATENT DOCUMENTS

| | | | |
|---|---|---|---|
| 2003/0067866 A1 | 4/2003 | Jung | |
| 2007/0258394 A1* | 11/2007 | Hamaguchi | H04L 5/0044 370/310 |
| 2008/0316913 A1* | 12/2008 | Kim | H04B 7/061 370/210 |
| 2009/0296564 A1 | 12/2009 | Kwon et al. | |
| 2010/0080114 A1* | 4/2010 | Ratnam | H04L 5/0007 370/210 |
| 2010/0080310 A1 | 4/2010 | Moffatt et al. | |
| 2011/0135016 A1* | 6/2011 | Ahn | H04L 5/0037 375/259 |
| 2012/0143936 A1* | 6/2012 | Katayama | G06F 17/141 708/404 |
| 2012/0320845 A1* | 12/2012 | Choi | G01S 13/876 370/329 |
| 2013/0003627 A1 | 1/2013 | Kravtsov | |

OTHER PUBLICATIONS

Cai, X., and Giannakis, G.B., "Adaptive PSAM Accounting for Channel Estimation and Prediction Errors," IEEE Transactions on wireless communications, vol. 4, Issue 1, pp. 246-256 (Jan. 2005).

Cavers, J.K., "An analysis of Pilot Symbol Assisted Modulation for Rayleigh Fading Channels," IEEE Transactions on Vehicular Technology, vol. 40,Issue 4, pp. 686-693 (Nov. 1991).

International Search Report and Written Opinion for International Application No. PCT/IB2013/60184 dated Aug. 18, 2014.

Jiang, T., and Wu, Y., "An Overview: Peak-to-Average Power Ratio Reduction Techniques for OFDM Signals," IEEE transactions on broadcasting, vol. 54, No. 2, pp. 257-268 (Jun. 2008).

Myung, H. G., et al., "Single Carrier FDMA for Uplink Wireless Transmission," IEEE Vehicular Technology Magazine, vol. 1, Issue 3, pp. 30-38 (Sep. 2006).

Ruangsurat, N., and Rajatheva, R.M.A.P., "An investigation of peak-to-average power ratio in MC-CDMA combined with partial transmit sequence," IEEE VTS 53rd Vehicular Technology Conference, 2001, vol. 1, pp. 761-765 (2001).

Sayed-Ahmed, A., et al., "PAPR reduction for LFDMA using a reduced complexity PTS scheme," The Online Journal on Electronics and Electrical Engineering (OJEEE), vol. 4, No. 2, pp. 524-530 (Apr. 2012).

Extended European Search Report for European Application No. 13892595.3, dated Dec. 6, 2016, pp. 7.

Liu, L., et al., "Uplink Access Schemes for LTE-Advanced," IEICE Transactions on Communications, vol. E92-B, No. 5, pp. 1760-1768 (May 2009).

* cited by examiner

US 10,193,728 B2

TUNABLE PEAK-TO-AVERAGE POWER RATIO FREQUENCY DIVISION MULTIPLEXING

CROSS REFERENCE CROSS-REFERENCE TO RELATED APPLICATIONS

This Application is the U.S. National Stage filing under 35 U.S.C. § 371 of International Application No. PCT/IB2013/060184, filed on Nov. 16, 2013, which claims priority under 35 U.S.C. §§ 119(a) and 119(b) to Indian Patent Application No. 2502/DEL/2013, filed on Aug. 24, 2013. The disclosures of international Application No. PCT/IB2013/060184 and Indian Patent Application No. 2502/DEL/2013 are herein incorporated by reference in their entireties.

BACKGROUND

Unless otherwise indicated herein, the materials described in this section are not prior art to the claims in this application and are not admitted to be prior art by inclusion in this section.

Transmission from a base-station to a mobile device may be spread across in time and frequency using a spreading technique, such as orthogonal frequency division multiple access (OFDMA). A spreading technique may be used in some mobile communication standards, such as Long Term Evolution (LTE), by assigning time and frequency slots to individual user devices.

Peak-to-average-power ratio (PAPR) is a concern that typically occurs in orthogonal frequency division multiplexing (OFDM) modulation. OFDM is used in multiple communication technologies such as WiFi, WiMAX, LTE-Advanced, and similar ones for applications such as digital television, wireless networks, and 4G mobile communications.

For an N-carrier OFDM signal, PAPR may equal about N, where N is an integer greater than or equal to 2. At certain time instances, individual contributions from the subcarriers may align in phase and large magnitudes may be observed in the baseband signal. These large amplitudes may force power amplifiers to either work in the non-linear regions giving rise to large signal distortion, or to work far from the amplifier saturation region, which may lead to power inefficiencies. High PAPR may also involve the use of high-precision digital-to-analog converters (DACs), thereby increasing cost of equipment.

SUMMARY

The present disclosure generally describes methods, apparatus, systems, devices, and/or computer program products to provide tunable peak-to-average power ratio (PAPR) frequency division multiplexing in communication networks.

In some examples, various methods to provide tunable peak-to-average power ratio (PAPR) frequency division multiplexing for transmission in a communication network are described. An example method may include receiving an N-symbol transmission vector, partitioning the N-symbol transmission vector into k equal partitions, and performing a Fast Fourier Transform (FFT) operation of size N/k on each of the partitions, where k is an integer equal or greater than 1. The method may also include generating an interleaving union of FFT results, where the interleaving union of FFT results comprises N subcarriers and wherein each of the N subcarriers includes information about N/k symbols, mapping results of the interleaving union to M subcarriers, wherein N is a subset of M, and generating a time-domain signal for transmission based on an M-point inverse FFT (IFFT) of the mapped M subcarriers.

In other examples, various methods to provide tunable peak-to-average power ratio (PAPR) frequency division multiplexing for reception in a communication network are described. An example method may include performing analog-to-digital conversion (ADC) on a received signal encoded with a tunable PAPR frequency division multiplex technique, performing a Fast Fourier Transform (FFT) operation on the converted signal followed by an equalization operation on, to obtain FFT results, and de-mapping the N subcarriers of the FFT results from the M subcarriers, to obtain de-mapping results. The method may further include performing an interleaving partition of the de-mapping results such that each subcarrier includes information of N/k symbols, where k is an integer equal or greater than 1, performing an inverse FFT (IFFT) operation of size N/k on each interleaving partition result, to obtain IFFT results, and performing symbol detection on the IFFT results.

In further examples, a controller for a communication network configured to employ tunable peak-to-average power ratio (PAPR) frequency division multiplexing is described. The example controller may include a communication module configured to communicate with multiple end user devices over a wireless network and a processor coupled to the communication module. The processor may be configured to receive an N-symbol transmission vector, partition the N-symbol transmission vector into k equal partitions, where k is an integer equal or greater than 1, and perform a Fast Fourier Transform (FFT) operation of size N/k on each of the partitions. The processor may be further configured to generate an interleaving union of FFT results, where the interleaving union of FFT results includes N subcarriers and each of the N subcarriers includes information about N/k symbols, map results of the interleaving union to M-subcarriers, where N is a subset of M, and generate a time-domain signal for transmission based on an M-point Inverse FFT (IFFT) of the mapped M subcarriers.

In yet other examples, an end user device to provide tunable peak-to-average power ratio (PAPR) frequency division multiplexing for reception in a communication network is described. The example end user may include a memory configured to store instructions and a processor coupled to the memory. The processor may perform or cause to be performed one or more of analog-to-digital conversion (ADC) and symbol detection on a received signal encoded with tunable PAPR frequency division multiplex technique, a Fast Fourier Transform (FFT) operation on M subcarriers of the received signal, to obtain FFT results, and a de-map of N subcarriers of the FFT results from the M subcarriers, to obtain de-mapping results. The processor may also perform or cause to be performed one or more of an interleaving partition of the de-mapping results such that each subcarrier includes information of N/k symbols, where k is an integer equal or greater than 1, an inverse FFT (IFFT) operation of size N/k on each partition, to obtain IFFT results, and symbol detection on the IFFT results.

In yet further examples, a computer-readable storage medium may be described with instructions stored thereon to provide tunable PAPR frequency division multiplexing for transmission in a communication network, provide tunable PAPR frequency division multiplexing for reception in a communication network, and the instructions causing one or more methods to be performed in response to execution. The methods may be similar to the methods described above.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The below described and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
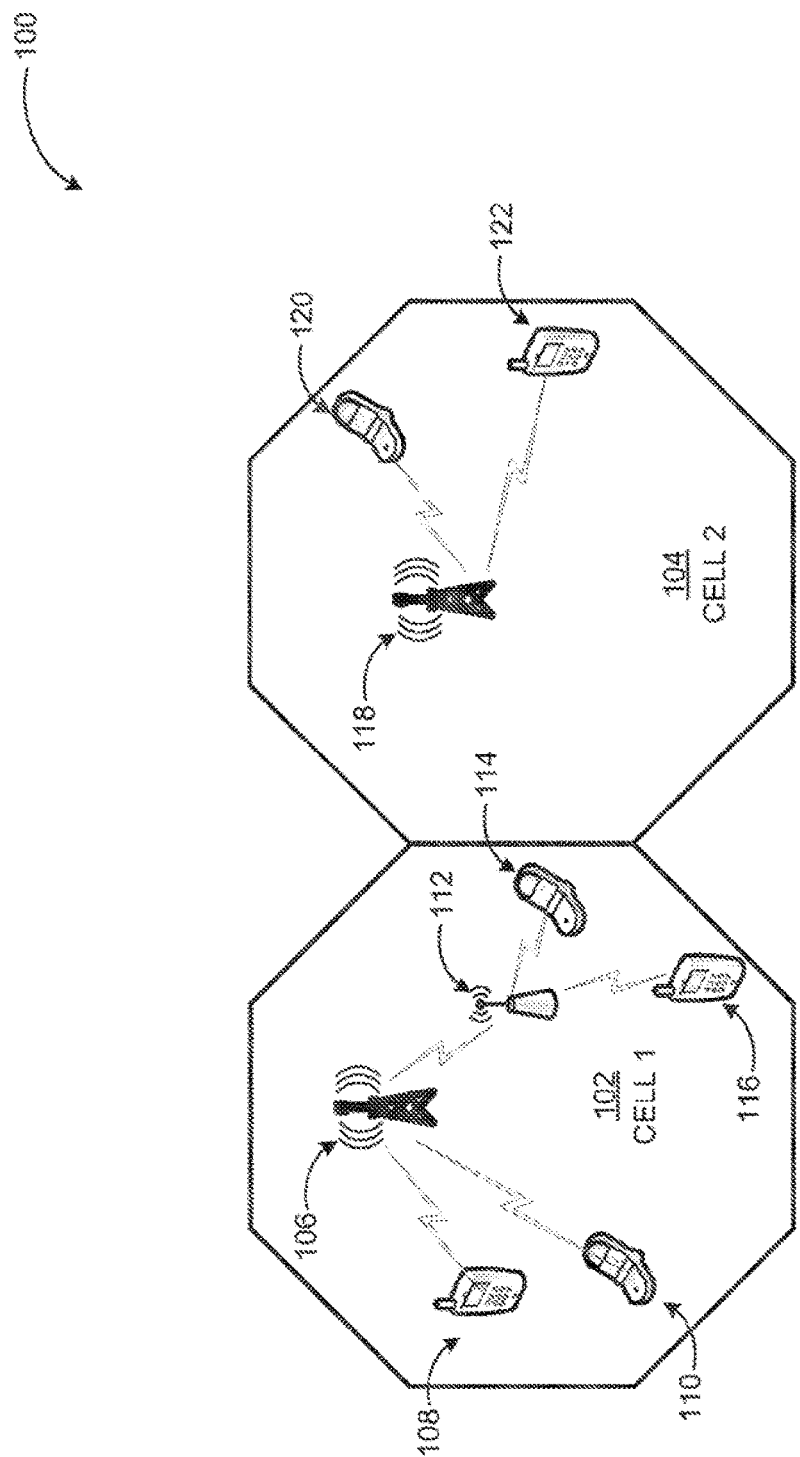
FIG. 1 illustrates two cells of an example cellular communication system, where tunable PAPR frequency division multiplexing may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to providing tunable peak-to-average power ratio (PAPR) frequency division multiplexing in communication networks.

Briefly stated, technologies are generally provided to enable the peak-to-average power ratio (PAPR) in OFDM communication systems to be adjusted to a particular level. In some examples, an N-symbol transmission vector may be partitioned into k equal partitions, a Fast Fourier Transform (FFT) may be performed on each partition, and an interleaving union of FFT results may be generated. The results of the interleaving union may be used for transmission after mapping them to the M subcarriers and performing an M-point IFFT. On the receiver side, FFT may be performed on M subcarriers, where each of L end user devices may be assigned N subcarriers out of M=N*L available subcarriers. The N subcarriers of the FFT results may be de-mapped and subjected to an interleaving partition. Subsequently, an inverse FFT (IFFT) may be performed on each partition and results of the IFFT operation employed for symbol detection.

FIG. 1 illustrates two cells of an example cellular communication system, where tunable PAPR frequency division multiplexing may be implemented, arranged in accordance with at least some embodiments described herein.

Some wireless communication networks, specifically cellular communication systems for example, employ "cells" as network infrastructure. Each cell may be typically served by a base station that enables end user devices (EUs), in this case mobile devices, to communicate wirelessly with other EUs within the same cell, in other cells, and in other systems. As shown in a diagram 100, a geographic area of a wireless network may be divided into two neighboring cells, cell 1 102 and cell 2 104. Cell 1 102 may be served by a base station (BTS) 106 and may include end user devices 108, 110, 114, and 116. Cell 2 104, may be served by a base station 118 and may include end user devices 120 and 122.

In some scenarios, a relay device 112 may be employed to facilitate communication between one or more EUs (e.g., EUs 114 and 116) and a base station (e.g., BTS 106). For example, when the wireless signal is weak in a particular location due to interference, geographic structure, manmade obstructions, etc., a relay device may assist in establishing a reliable link between the base station and the EUs.

A wireless network may be one of an Evolved Universal Mobile Telecommunications System Terrestrial Radio Access Network (eUTRAN), a long term evolution (LTE) network, an LTE-Advanced network, a high speed packet access (HSPA) network, an HSPA-Advanced network, or other wireless network. A mobile device may include one of a cellular phone, a smart phone, a computing device equipped with cellular communication capability, a specialized device equipped with cellular communication capability, or other type of mobile electronic device. Furthermore, a wireless communication technology between a base station and a mobile device may utilize one of frequency division multiple access (FDMA), orthogonal frequency division multiple access (OFDMA), a narrow band allocation technology, or other wireless communication technology.

The PAPR is a relative measure that may be defined in one embodiment as the peak amplitude squared (giving the peak power) divided by the root mean square (RMS) value of the amplitude squared (giving the average power). The PAPR for an N-point discrete-time signal, $x[n]$ ($n=0, 1, \ldots, N-1$), may be defined, for example, as:

$$PAPR = \frac{\max_{0 \le n \le N-1} |x[n]|^2}{\frac{1}{N}\Sigma_n |x[n]|^2} \qquad [1]$$

In general, modulation techniques that have smaller PAPR may usually transmit more bits per second than modulation techniques that have higher PAPR. The reasons for this difference may include linear amplifiers having a peak output power (a maximum possible instantaneous peak amplitude the amplifier can support and still stay in the linear range), the average power of the signal being the peak output power divided by the PAPR, and/or the number of its per second transmitted (on average) being proportional to the average power transmitted as defined by the Shannon-Hartley theorem.

In 4G LTE systems, BTSs may use OFDMA on the downlink whereas the EUs may use "single carrier modulation" (more precisely single carrier FDMA, SC-FDMA) on the uplink to avoid high PAPR. BTSs may be able to use complex electronics, which can handle high PAPR. The EUs may typically be designed to be low cost and hence may not include hardware that is capable of handling high PAPR. Single carrier modulation has a smaller PAPR than OFDM but may be associated with poorer performance in terms of bit-error rate (BER).

By tuning a parameter (k), techniques according to some embodiments may set PAPR to k. OFDMA (k=N) and SC-FDMA (k=1) may be two extreme values of k used in this approach. Thus, a system according to embodiments may, instead of using single carrier modulation, which may have very good PAPR and may have poor BER performance, allow moderate PAPR with better BER performance, depending on a level of PAPR the EU can tolerate.

Figure 2:
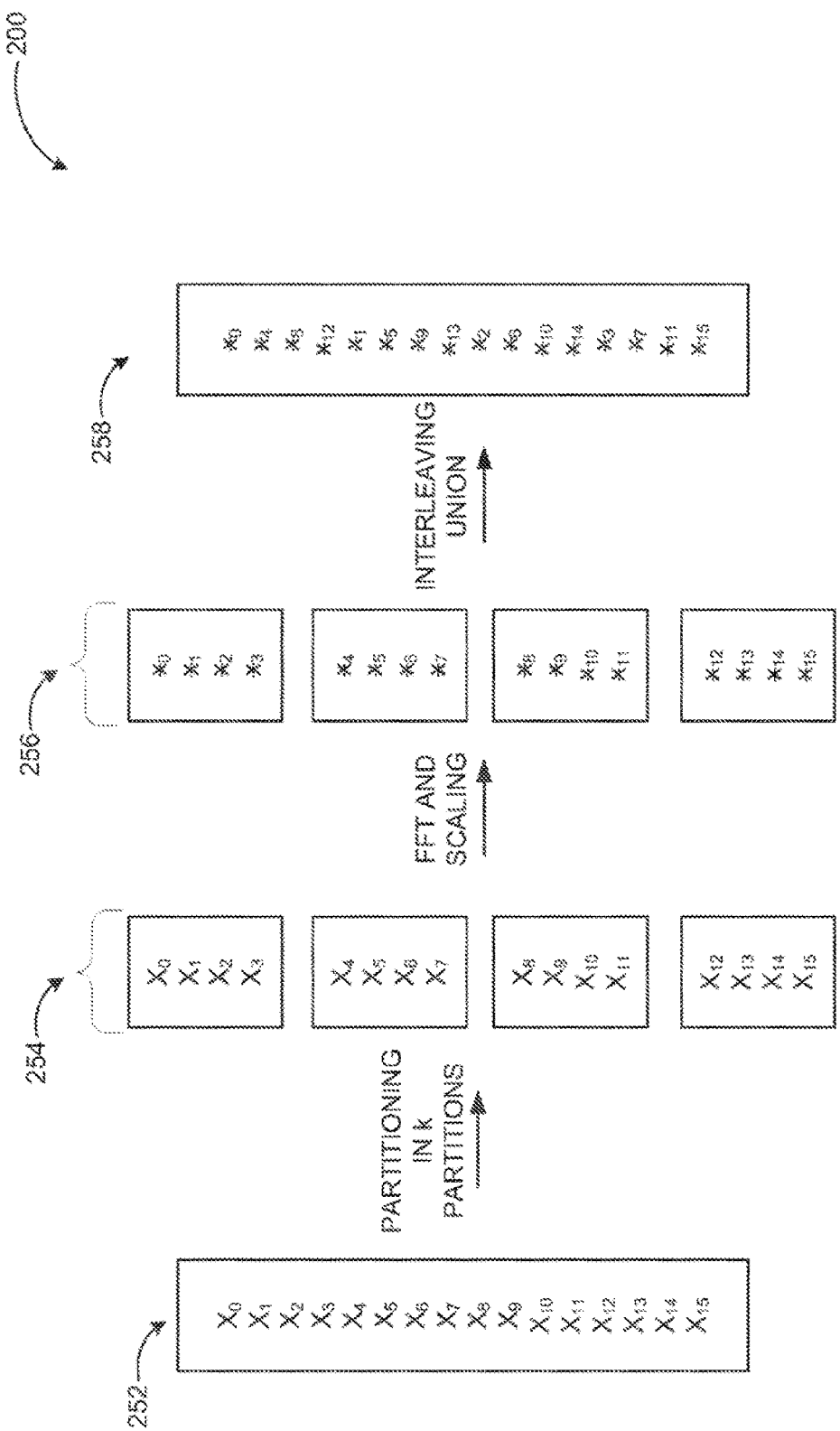
FIG. 2 illustrates an example modified operation of a transmitter which may replace the Fast Fourier Transform (FFT) operation in an SC-FDMA system.

FIG. 2 illustrates an example modified operation of a transmitter arranged in accordance with at least some embodiments described herein. The modified operation may replace the Inverse Fast Fourier Transform (IFFT) operation in an OFDM system.

As mentioned above, high PAPR is known to negatively affect system performance in communication networks, and may necessitate the use of power amplifiers with large linear range, complex digital-to-analog converters (DACs), and similar electronics. To reduce PAPR, some advanced communications systems such as 4G LTE may implement a modulation method called single carrier (SC) modulation on the uplink. Such systems may also employ OFDM on the downlink communication from base stations, which can afford to use more complicated electronics than end user devices and tolerate high PAPR.

A system employing tunable PAPR Frequency Division Multiplexing (FDM) according to some embodiments may adjust the worst-case PAPR of the generated signal to k through a parameter k. For communication systems using tunable PAPR FDM, the parameter k may be set based on the PAPR that the end user device and/or base station electronics can tolerate. If the electronics can tolerate higher PAPR, then smaller values of k may be selected. OFDMA (k=N) and SC-FDMA (k=1) are two extremes of tunable PAPR FDM. It is noted that the choice of k may take into consideration other performance metrics such as bit error rate (BER).

The computational complexity at transmitter and receiver of tunable PAPR FDMA according to some embodiments may be lower than conventional SC-FDMA. This may be because an N-point FFT (IFFT) at the conventional transmitter (receiver) is replaced by k different N/k-point FFTs (IFFTs) in some embodiments.

As shown in a diagram 200, implementation of tunable PAPR FDM on transmit side may begin with partitioning of the N-symbol transmission vector 252 into 'k' equal partitions 254. As mentioned above, k=1 corresponds to SC-FDMA and k=N corresponds to OFDMA. Next, a Fast Fourier Transform (FFT) of size N/k may be carried out on each of the k partitions resulting in transformed partitions 256. In the example of diagram 200, k=4 is selected for illustration purposes. An interleaving union 258 of the transformed partitions 256 (or scaled version of the same) may be taken. Using FFTs of size N/k ensures N/k-symbol decodability, such that each subcarrier of a transmitted signal contains information of N/k symbols. As in conventional SC-FDMA, these N-points in the interleaving union may be mapped to M-subcarriers. The remaining subcarriers may be zeroed. The interleaved union 258 when followed by a distributed mapping to M-subcarriers ensures a PAPR of k. This may be followed by an M-point IFFT to generate a time-domain signal for transmission.

Figure 3:
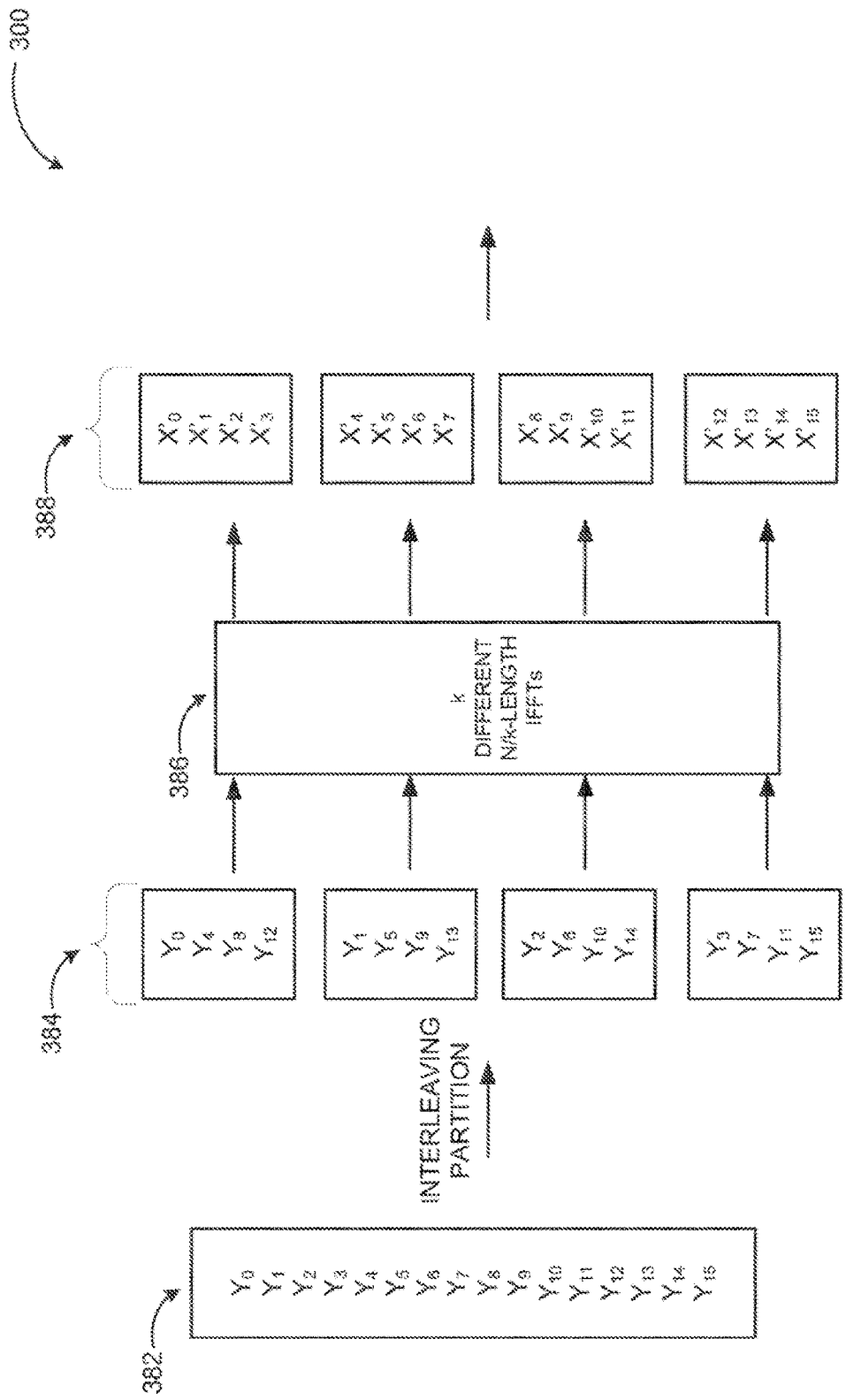
FIG. 3 illustrates an example modified operation that may be implemented in an example receiver.

FIG. 3 illustrates an example operation that may be implemented in an example receiver, arranged in accordance with at least some embodiments described herein.

Diagram 300 summarily depicts operations on a received signal. In a receiver according to some embodiments, an interleaving partition may be performed on an estimate of the N-symbol transmission vector Y derived from the received signal and based on the tunable PAPR FDM signal. The vector Y may be partitioned into k partitions 384. In the example of diagram 300, k=4 is selected for illustration purposes. The complex amplitude of every subcarrier, $Y_j$, of the tunable PAPR FDM contains information about N/k constellation points from an original transmission vector X, since Y is an estimate of vector 258 of FIG. 2. Following an N/k-length IFFT operation 386 on each of the partitions 384, subcarriers of the partitioned original transmission vector 388 (X') may be estimated through de-mapping, which is indicated by elements $X'_l$ in the transmission vector 388.

In multi-user access systems (such as uplink in LTE) several users may share the available subcarriers and transmit simultaneously to a central node (such as a base station). To implement a multi-user tunable PAPR FDM system, mapping and de-mapping of IFFT and FFT results may be used as explained below.

Figure 4A:
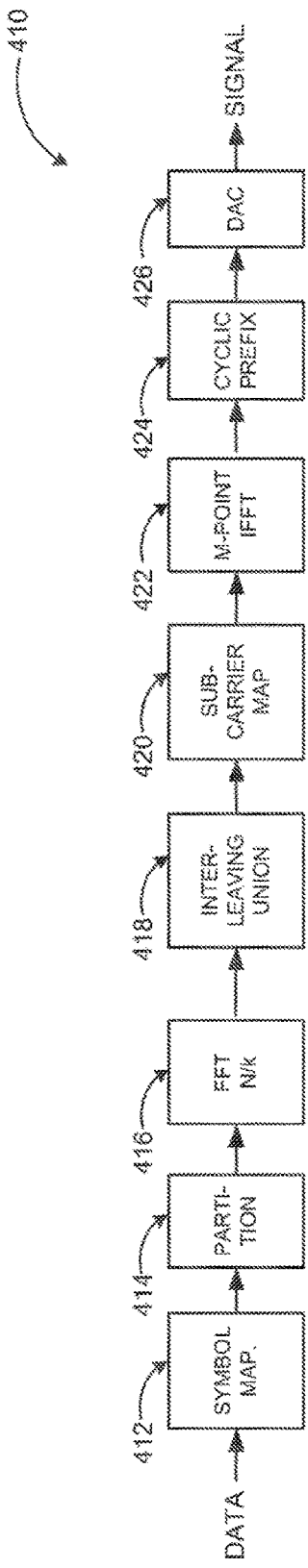
FIGS. 4A and 4B illustrate block diagrams of an example transmitter and an example receiver implementing tunable PAPR frequency division multiplexing.
Figure 4B:
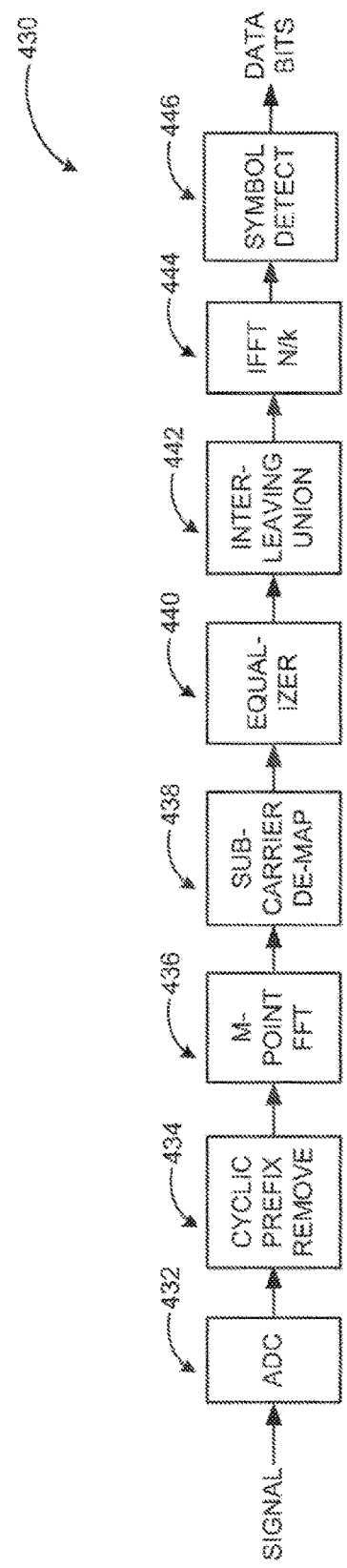

FIGS. 4A and 4B illustrate block diagrams of an example transmitter and an example receiver implementing tunable PAPR frequency division multiplexing, arranged in accordance with at least some embodiments described herein.

Diagram 410 of FIG. 4A shows major operational blocks of the transmit side, where data to be transmitted may be subjected to symbol mapping 412, partition 414, and FFT operation 416 on each of the partitions (N/k). Results of an interleaving union 418 on the partitions (e.g., vector 250 of FIG. 2) may then be mapped to subcarriers 420. An M-point IFFT 422 may be performed on the subcarriers, followed by cyclic prefix 424 and DAC 426. Additional OFDM operations may also be performed on the resulting signal before it is transmitted. Supposing that there are L users, each assigned N subcarriers, and that the total number of subcarriers is M=NL, the N-point FFT and the M-point IFFT may be based upon the number of assigned and total subcarriers.

In a conventional SC-FDMA transmitter, data symbols may be fed directly to an FFT block. According to some embodiments, instead of feeding directly to an FFT block, data symbols may first undergo an interleaving partition 414 and an N/k point FFT 416 may be applied to each of the partitions. The resultant N-point signal may be mapped to N subcarriers and the rest of the subcarriers may be set to zero as discussed above. The sub-carrier mapping 420 may be localized or distributed (interleaved). In localized mapping, all N subcarriers carrying data may be clubbed together, whereas in interleaved mapping every $L^{th}$ subcarrier may carry data. Following the mapping, regular SC-FDMA operations such as cyclic prefix may be carried out. A cyclic prefix may typically be attached to an SC-FDMA (or OFDMA) signal in order to simplify channel estimation and equalization.

An example receiver may receive an RF signal through its antenna and process the received RF signal through phase shifted multiplication to convert the RF signal into baseband signal. The converted signal may be passed through filters and digitized using analog-to-digital converters (ADCs). According to some embodiments, the digitized signal may be subjected to an operation, which may include one or more of an interleaved partitioning of the signal into k partitions, an FFT operation on each partition, and optionally a scaling. Results of the modified operation may then be de-mapped and utilized for further operations at the receiver.

On the receiver side, shown in diagram 430 of FIG. 4B, received signal may be digitized through ADC 432 and cyclic prefix may be removed 434. Subsequently, an M-point FFT operation 436 may be performed and the subcarriers de-mapped 438. Following equalization 440, an interleaving union 442 may be performed and the results may be subjected to an IFFT operation 444 as discussed above. In a distortionless environment, simply inverting the operations carried out at the transmitter may be sufficient to recover the constellation points $X_l$. However, since channel distortion may affect different sub-channels differently, equalization 440 may be performed. Results of the IFFT operation 444 may be used for symbol detection 446 to obtain the data bits.

Various example embodiments are described above using specific values, parameters, and configurations. These examples are for illustration purposes only and are not intended to constitute a limitation on embodiments. Embodiments may be implemented with any reasonable values and suitable parameters and configurations using the principles described herein.

Figure 5:
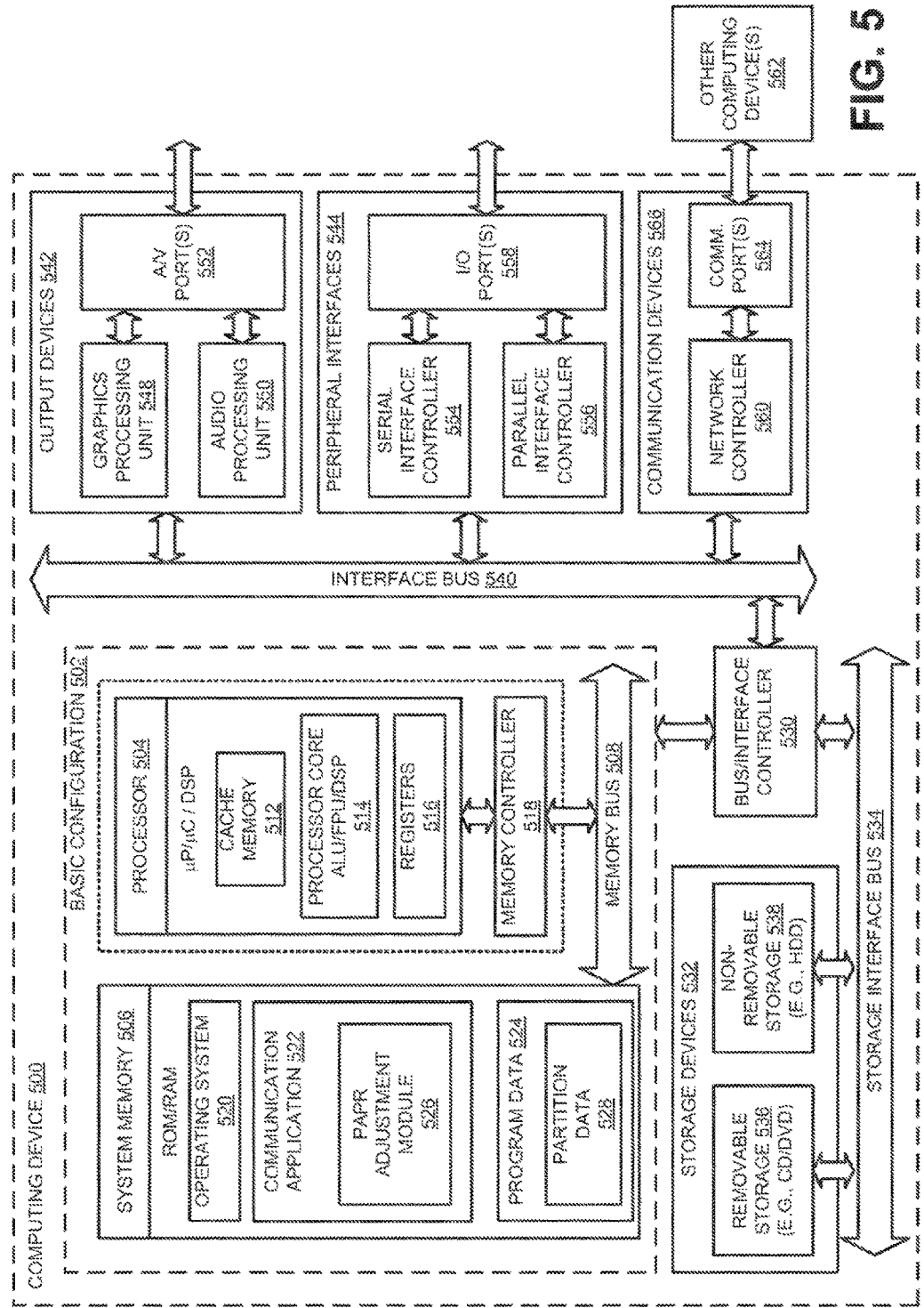
FIG. 5 illustrates a general purpose computing device, which may be used to implement tunable PAPR frequency division multiplexing in wireless networks.

FIG. 5 illustrates a general purpose computing device, which may be used to implement tunable PAPR frequency division multiplexing in wireless networks, arranged in accordance with at least some embodiments described herein.

In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof. Processor 504 may include one more levels of caching, such as a level cache memory 512, a processor core 514, and registers 516. Example processor core 514 may include an arithmetic logic unit (ALU), a floating point unit (FPU), a digital signal processing core (DSP Core), or any combination thereof. An example memory controller 518 may also be used with processor 504, or in some implementations memory controller 514 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more communication applications 522, and program data 524. Communication application 522 may include a PAPR adjustment module 526 that may partition a received N-symbol transmission vector into k equal partitions, perform FFT on the partitions, generate an interleaving result of the FFT results, and employ the results of the interleaving union for transmission. Then, the communication application 522 may utilize a multiple access technology such as frequency division multiple access (FDMA), orthogonal frequency division multiple access (OFDMA), Carrier-Sense Multiple Access (CSMA), or a narrow band allocation technology to enable communication between a base station and mobile device. Program data 524 may include one or more of partition data 528 and similar data as discussed above in conjunction with at least FIG. 1 through 4. This data may be useful for providing tunable frequency division multiplexing as is described herein. This described basic configuration 502 is illustrated in FIG. 5 by those components within the inner dashed line. Computing device 500 may be implemented as a server in a communication network or as part of a base station in such a network.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 566 to basic configuration 502 via bus/interface controller 530. Example output devices 542 include a graphics processing unit 548 and an audio processing unit 540, which may be configured to communicate to various external devices such as a display or speakers via one or more A/V ports 542. Example peripheral interfaces 544 include a serial interface controller 544 or a parallel interface controller 546, which may be configured to communicate with external devices such as input devices (e.g., keyboard, mouse, pen, voice input device, touch input device, etc.) or other peripheral devices (e.g., printer, scanner, etc.) via one or more I/O ports 548. An example communication device 566 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct wired connection, and wireless media such as acoustic, radio frequency (RF), microwave, infrared (IR) and other wireless media. The term computer readable media as used herein may include both storage media and communication media.

Computing device 500 may be implemented as a portion of a physical server, virtual server, a computing cloud, or a hybrid device that include any of the above functions. Computing device 500 may also be implemented as a personal computer including both laptop computer and non-laptop computer configurations. Moreover computing device 500 may be implemented as a networked system or as part of a general purpose or specialized server.

Networks for a networked system including computing device 500 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such (e.g., the Internet). The networks may also comprise a plurality of distinct networks that are adapted to operate together. Such networks are configured to provide communication between the nodes described herein. By way of example, and not limitation, these networks may include wireless media such as acoustic. RF, infrared and other wireless media. Furthermore, the networks may be portions of the same network or separate networks.

Figure 6:
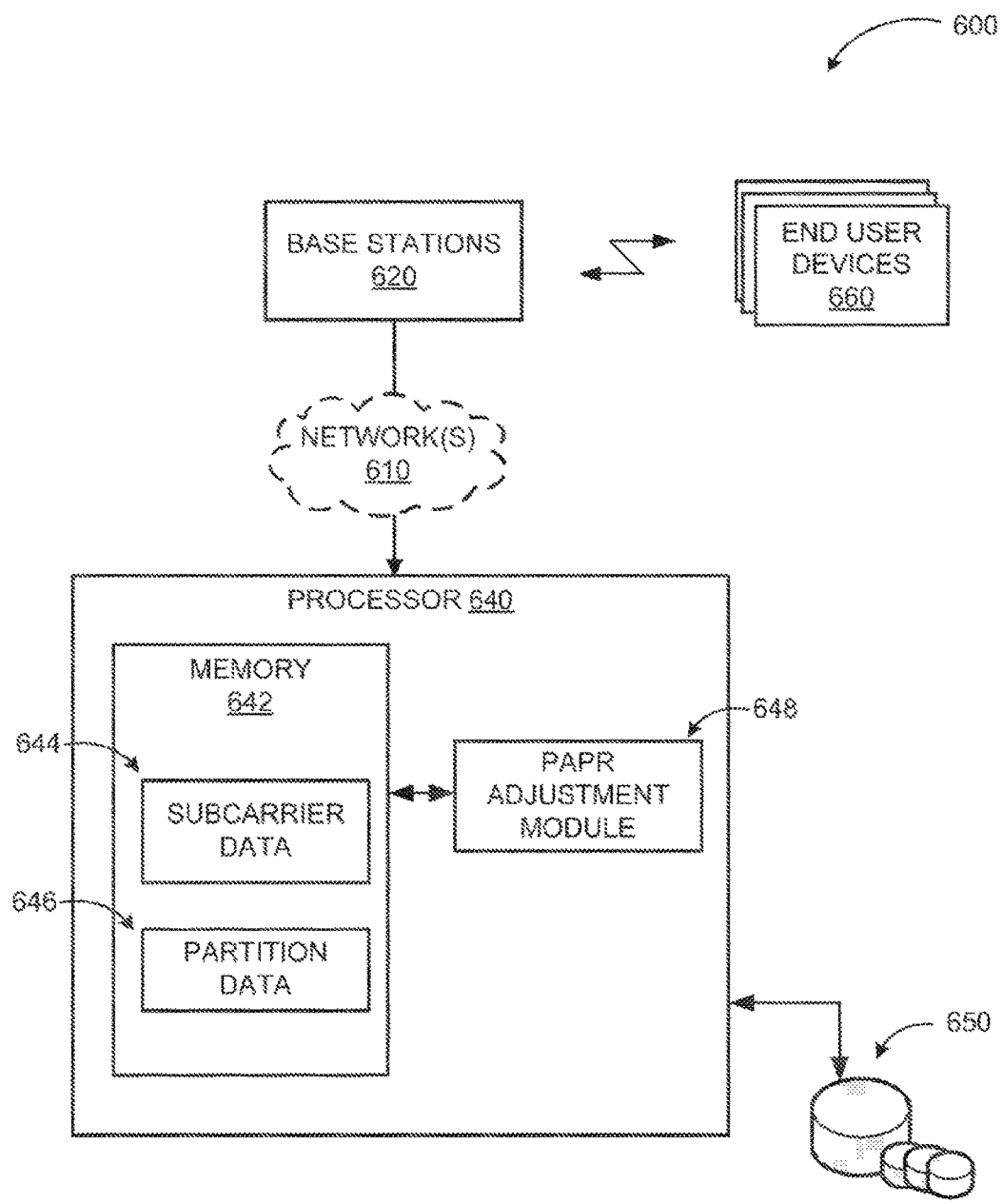
FIG. 6 illustrates a special purpose processor, which may be used to implement tunable PAPR frequency division multiplexing in wireless networks.

FIG. 6 illustrates a special purpose processor, which may be used to implement tunable PAPR frequency division multiplexing in wireless networks, arranged in accordance with at least some embodiments described herein.

Processor 640 may be part of a control system of base stations 620 through network(s) 610 for providing tunable PAPR frequency division multiplexing in wired or wireless communication networks. Processor 640 may also communicate with data sources 650 storing network related information. Base stations 620 may communicate with end user devices 660 wirelessly or through a wired medium.

Processor 640 may include a number of processing modules such as a PAPR adjustment module 648. Subcarrier data 644 and partition data 646 may be used by processor 640 in conjunction with the PAPR adjustment module 648 to perform tunable PAPR frequency division multiplexing. Subcarrier data 644 and partition data 646 may be stored during processing in memory 642, which may be a cache memory of the processor 640 or an external memory (e.g., memory external to processor 640).

Example embodiments may also include methods to provide tunable PAPR frequency division multiplexing in communication networks. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 7:
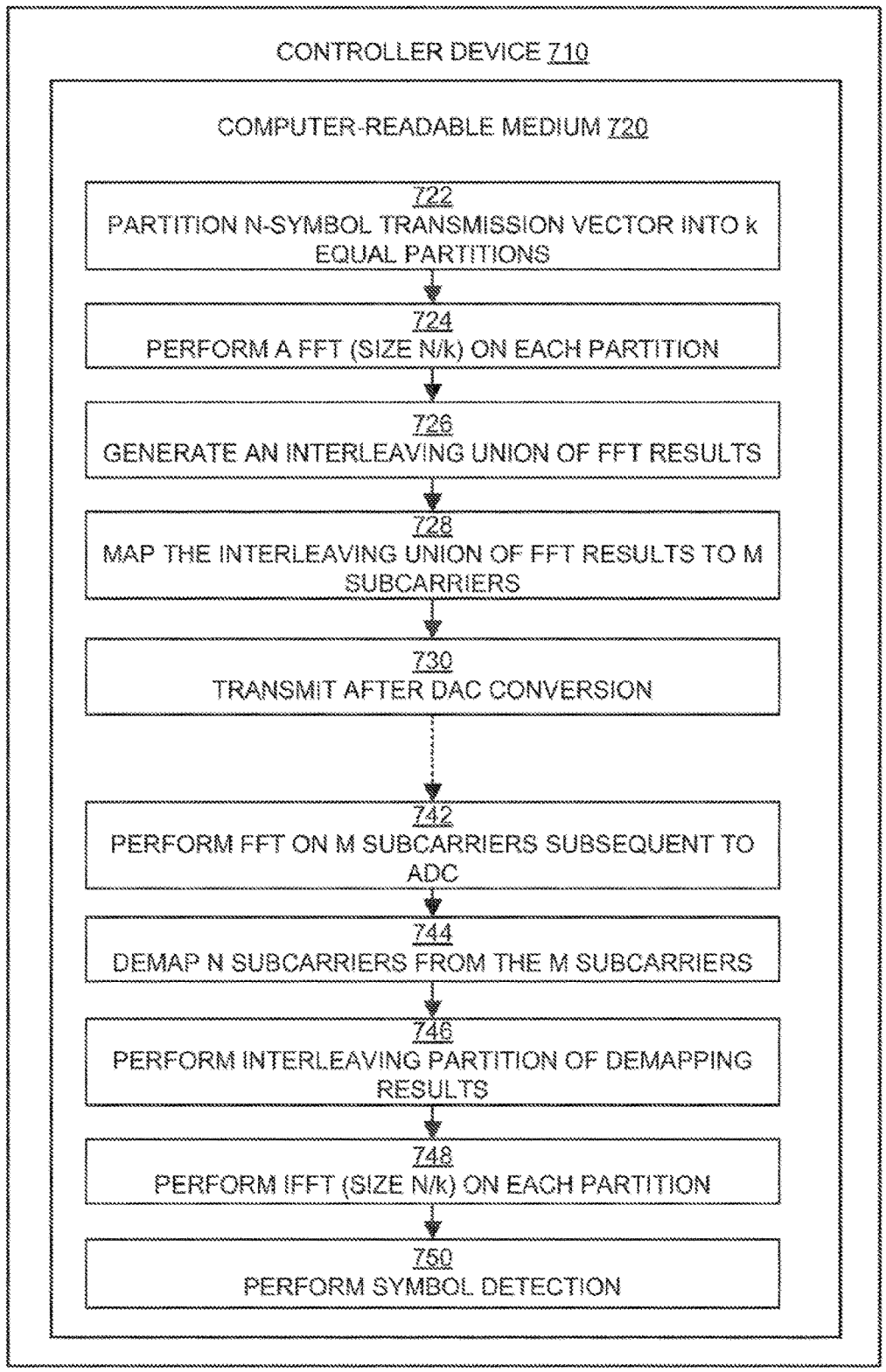
FIG. 7 is a flow diagram illustrating an example method to implement tunable PAPR frequency division multiplexing in wireless networks that may be performed by a computing device such as the computing device of FIG. 5 or the special purpose processor of FIG. 6.

FIG. 7 is a flow diagram illustrating an example method to implement tunable PAPR frequency division multiplexing in wireless networks that may be performed by a computing device such as the computing device in FIG. 5 or the special purpose processor of FIG. 5, arranged in accordance with at least some embodiments described herein.

Example methods may include one or more operations, functions or actions as illustrated by one or more of blocks 722 through 750, and may in some embodiments be performed by a computing device such as the computing device 500 in FIG. 5 or processor 640 of FIG. 6. The operations described in the blocks 722-750 may also be stored as computer-executable instructions in a non-transitory computer-readable medium such as a computer-readable medium 720 of a controller device 710.

An example method for providing tunable PAPR frequency division multiplexing in a communication network may begin with block 722, "PARTITION N-SYMBOL TRANSMISSION VECTOR INTO k EQUAL PARTITIONS," where a transmitter according to embodiments may partition a transmission vector into k equal partitions. The PAPR for a system according to embodiments may be k.

Block 722 may be followed by block 724, "PERFORM A FFT (SIZE N/k) ON EACH PARTITION", where Fast Fourier Transform may be performed on each of the partitions. Results of the FFT operation may be optionally scaled to maintain the signal power level.

Block 724 may be followed by block 726, "GENERATE AN INTERLEAVING UNION OF FFT RESULTS", where an interleaving union of the optionally scaled FFT results may be taken. Thus, each subcarrier may include information of N/k symbols.

Block 726 may be followed by block 728, "MAP THE INTERLEAVING UNION OF FFT RESULTS TO M SUBCARRIERS", where a distributed or localized subcarrier mapping scheme may be employed to map the N-point signal to the M subcarriers. As a result, the PAPR may be k.

Block 728 may be followed by block 730, "TRANSMIT AFTER DAC CONVERSION", where operations such as symbol detection and digital-to-analog conversion may be performed prior to transmission of the signal.

The above-described operation on the transmit side of a system according to embodiments may be followed by operations on the receive side beginning with block 742, "PERFORM FFT ON M SUBCARRIERS SUBSEQUENT TO ADC", where a receiver may perform an M-point FFT operation on the subcarriers. The M-point FFT operation may be performed on the subcarriers after ADC and cyclic prefix removal.

Block 742 may be followed by block 744, "DEMAP N SUBCARRIERS FROM THE M SUBCARRIERS", the non-zero subcarriers of the received signal may be demapped after the FFT operation.

Block 744 may be followed by block 746, "PERFORM INTERLEAVING PARTITION OF DE-MAPPING RESULTS", where following de-mapping of the subcarriers, an interleaving partition of the de-mapping results may be performed.

Block 746 may be followed by block 748, "PERFORM IFFT (SIZE N/k) ON EACH PARTITION", where an inverse FFT of size N/k may be performed on each of the partitions.

Block 748 may be followed by block 750, "PERFORM SYMBOL DETECTION", where results of the IFFT may be subjected to symbol detection and other operations to obtain the data bits.

The operations included in the process of FIG. 7 described above are for illustration purposes. Tunable PAPR frequency division multiplexing in communication networks may be implemented by similar processes with fewer or additional operations, for example, further optimization operations may be added. In some examples, the operations may be performed in a different order. In some other examples, various operations may be eliminated. In still other examples, various operations may be divided into additional operations, or combined together into fewer operations. Although illustrated as sequentially ordered operations, in some implementations the various operations may be performed in a different order, or in some cases various operations may be performed at substantially the same time.

Figure 8:
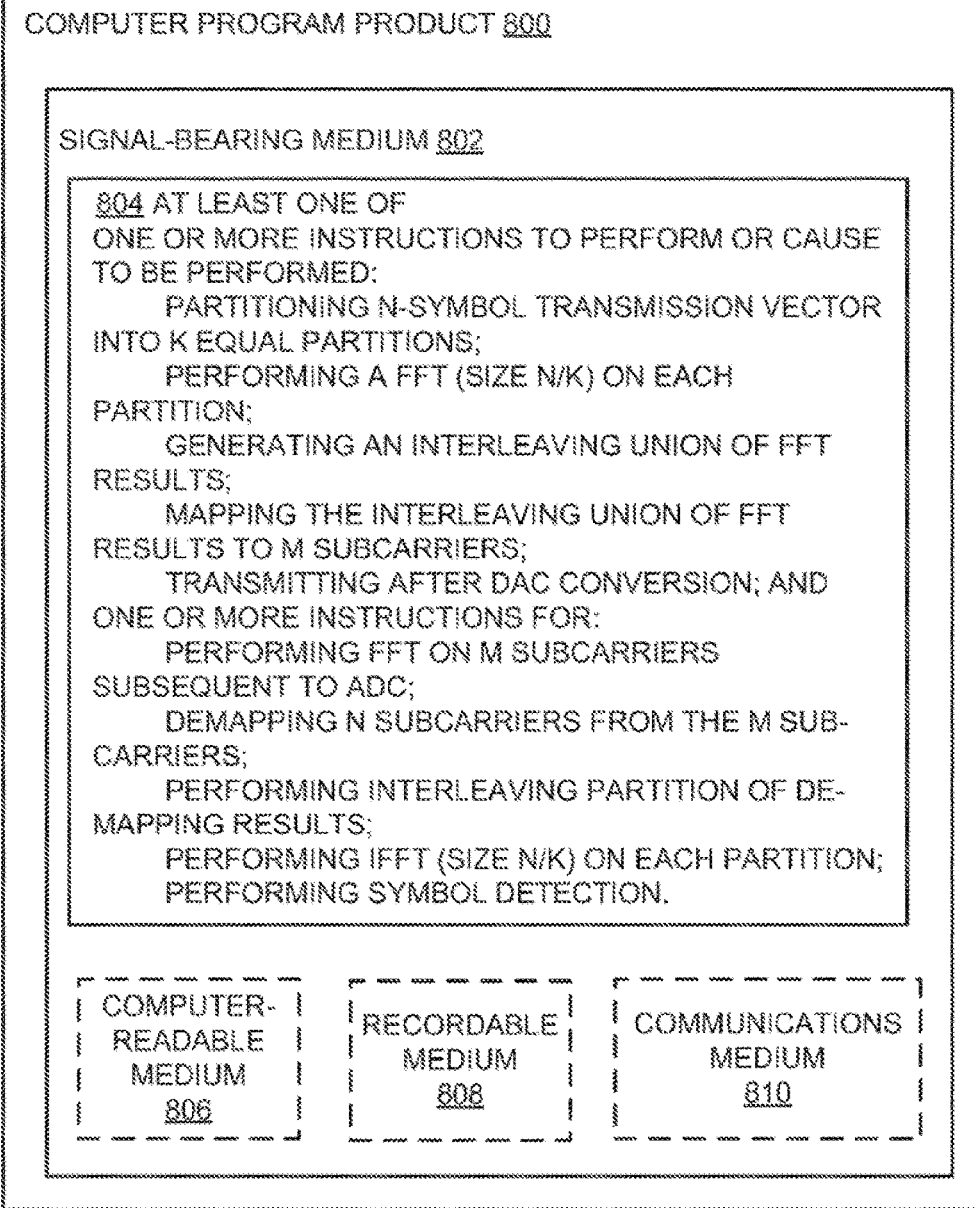
FIG. 8 illustrates a block diagram of an example computer program product to implement tunable PAPR frequency division multiplexing in wireless networks; all arranged in accordance with at least some embodiments described herein.

FIG. 8 illustrates a block diagram of an example computer program product for tunable PAPR frequency division multiplexing in wireless networks, arranged in accordance with at least some embodiments described herein.

In some examples, as shown in FIG. 8, computer program product 800 may include a signal bearing medium 802 that may also include machine readable instructions 804 that, in response to execution by, for example, a processor, may provide the functionality described above with respect to FIG. 1 through FIG. 4. Thus, for example, referring to processor 640, one or more of the tasks shown in FIG. 8 may be undertaken in response to instructions 804 conveyed to the processor 640 by medium 802 to perform actions associated with performing implementation of tunable PAPR frequency division multiplexing in wireless networks as described herein. Some of those instructions may include partitioning an N-symbol transmission vector into k equal partitions; performing a FFT (size N/k) on each partition; generating an interleaving union of FFT results; mapping the interleaving union of FFT results to M subcarriers; transmitting after DAC conversion; as well as performing FFT on M subcarriers subsequent to ADC; de-mapping N subcarriers from the M subcarriers; performing interleaving partition of de-mapping results; performing IFFT (size N/k) on each partition; performing symbol detection.

In some implementations, signal bearing medium 802 depicted in FIG. 8 may encompass a computer-readable medium 806, such as, but not limited to, a hard disk drive, a Compact Disc (CD), a Digital Versatile Disk (DVD), a digital tape, memory, etc. In some implementations, signal bearing medium 802 may encompass a recordable medium 808, such as, but not limited to, memory, read/write (R/W) CDs. R/W DVDs, etc. In some implementations, signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, computer program product 800 may be conveyed to the processor 804 by an RF signal bearing medium 802, where the signal bearing medium 802 is conveyed by a wireless communications medium 810 (e.g., a wireless communications medium conforming with the IEEE 802.11 standard).

In some examples, various methods to provide tunable peak-to-average power ratio (PAPR) frequency division multiplexing for transmission in a communication network are described. An example method may include receiving an N-symbol transmission vector, partitioning the N-symbol transmission vector into k equal partitions, and performing a Fast Fourier Transform (FFT) operation of size N/k on each of the partitions, where k is an integer equal or greater than 1. The method may also include generating an interleaving union of FFT results, where the interleaving union of FFT results comprises N subcarriers and wherein each of the N subcarriers includes information about N/k symbols, mapping results of the interleaving union to M subcarriers, wherein N is a subset of M, and generating a time-domain signal for transmission based on an M-point inverse FFT (IFFT) of the mapped M subcarriers.

According to other examples, the N-symbol transmission vector may be a time domain array for transmission over a communication channel. Mapping the results of the interleaving union to the M subcarriers may be performed in one of a localized manner and a distributed manner. The method may also include selecting k to obtain a particular PAPR at a receiver or selecting k=1 to achieve single carrier frequency division multiple access (SC-FDMA).

According to further examples, the method may further include transmitting the generated time-domain signal over a wireless communication technology that utilizes one of frequency division multiple access (FDMA), orthogonal frequency division multiple access (OFDMA), or a narrow band allocation technology. Each end user device of L end user devices may be assigned N subcarriers out of M=N*L available subcarriers. The method may also include setting remaining subcarriers to substantially zero.

In other examples, various methods to provide tunable peak-to-average power ratio (PAPR) frequency division multiplexing for reception in a communication network are described. An example method may include performing analog-to-digital conversion (ADC) on a received signal encoded with a tunable PAPR frequency division multiplex technique, performing a Fast Fourier Transform (FFT) operation on the converted signal followed by an equalization operation on, to obtain FFT results, and de-mapping the N subcarriers of the FFT results from the M subcarriers, to obtain de-mapping results. The method may further include performing an interleaving partition of the de-mapping results such that each subcarrier includes information of N/k symbols, where k is an integer equal or greater than 1, performing an Inverse FFT (IFFT) operation of size N/k on each interleaving partition result, to obtain IFFT results, and performing symbol detection on the IFFT results.

According to further examples, de-mapping the N subcarriers of the FFT results from the M subcarriers may include de-mapping in one of a localized manner and a distributed manner based on a mapping scheme employed in the received signal. The method may further include performing a cyclic prefix removal operation on the M subcarriers. The method may also include transmitting the generated time-domain signal over a wireless communication technology that utilizes one of frequency division multiple access (FDMA), orthogonal frequency division multiple access (OFDMA), or a narrow band allocation technology.

Each end user device of L end user devices may be assigned N subcarriers out of M=N*L available subcarriers.

In further examples, a controller for a communication network configured to employ tunable peak-to-average power ratio (PAPR) frequency division multiplexing is described. The example controller may include a communication module configured to communicate with multiple end user devices over a wireless network and a processor coupled to the communication module. The processor may be configured to receive an N-symbol transmission vector, partition the N-symbol transmission vector into k equal partitions, where k is an integer equal or greater than 1, and perform a Fast Fourier Transform (FFT) operation of size N/k on each of the partitions. The processor may be further configured to generate an interleaving union of FFT results, where the interleaving union of FFT results includes N subcarriers and each of the N subcarriers includes information about N/k symbols, map results of the interleaving union to M-subcarriers, where N is a subset of M, and generate a time-domain signal for transmission based on an M-point Inverse FFT (IFFT) of the mapped M subcarriers.

In some examples, the N-symbol transmission vector may be a time domain array for transmission over a communication channel. The processor may be further configured to scale results of the FFT operation with a factor of square root of k in order to equalize an energy of a transmission signal. Each end user device of L end user devices may be assigned N subcarriers out of M=N*L available subcarriers. To map the interleaving union of the N subcarriers to the M subcarriers, the processor may employ one of a localized mapping and a distributed mapping. The processor may also be configured to select k=1 to achieve single carrier frequency division multiple access (SC-FDMA).

In yet other examples, the communication network may be configured to employ a communication technology that utilizes one of frequency division multiple access (FDMA), orthogonal frequency division multiple access (OFDMA), or a narrow band allocation technology. The processor may also be configured to set remaining subcarriers to substantially zero. The controller may be part of one of a base station and an end user device. The communication network may be one of a Evolved Universal Mobile Telecommunications System Terrestrial Radio Access Network (EUTRAN), a Long Term Evolution (LTE) network, or an LTE-Advanced network.

In yet other examples, an end user device to provide tunable peak-to-average power ratio (PAPR) frequency division multiplexing for reception in a communication network is described. The example end user may include a memory configured to store instructions and a processor coupled to the memory. The processor may perform or cause to be performed one or more of analog-to-digital conversion (ADC) and symbol detection on a received signal encoded with tunable PAPR frequency division multiplex technique, a Fast Fourier Transform (FFT) operation on M subcarriers of the received signal, to obtain FFT results, and a de-map of N subcarriers of the FFT results from the M subcarriers, to obtain de-mapping results. The processor may also perform or cause to be performed one or more of an interleaving partition of the de-mapping results such that each subcarrier includes information of N/k symbols, where k is an integer equal or greater than 1, an inverse FFT (IFFT) operation of size N/k on each partition, to obtain IFFT results, and symbol detection on the IFFT results.

According to further examples, to de-map the N subcarriers of the FFT results from the M subcarriers, the processor may be configured to execute the instructions to perform or cause to be performed: employ one of a localized de-mapping and a distributed de-mapping based on a mapping scheme employed by a transmitter. The communication network may be configured to employ a communication technology that utilizes one of frequency division multiple access (FDMA), orthogonal frequency division multiple access (OFDMA), or a narrow band allocation technology. The communication network may include one of an Evolved Universal Mobile Telecommunications System Terrestrial Radio Access Network (eUTRAN), a long term evolution (LTE) network, an LTE-Advanced network, a high speed packet access (HSPA) network, or an advanced HSPA network.

In yet further examples, a computer-readable storage medium may be described with instructions stored thereon to provide tunable PAPR frequency division multiplexing for transmission in a communication network, provide tunable PAPR frequency division multiplexing for reception in a communication network, and the instructions causing a or more methods to be performed in response to execution. The methods may be similar to the methods described above.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof, in one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the site functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method to provide tunable peak-to-average power ratio (PAPR) frequency division multiplexing for transmission in a communication network, the method comprising:
   receiving an N-symbol transmission vector;
   selecting k to obtain a particular PAPR at a receiver, wherein the selection of k is based on an acceptable value of the PAPR at the receiver, and wherein k is an integer value between 1 and N;
   partitioning the N-symbol transmission vector into k equal partitions;
   performing a fast Fourier transform (FFT) operation of size N/k on each of the k equal partitions of the N-symbol transmission vector;
   generating an interleaving union of k different FFT results, wherein the interleaving union of the k different FFT results comprises N subcarriers, and wherein each of the N subcarriers includes information about N/k symbols;
   mapping results of the interleaving union to M subcarriers, wherein N is a subset of M; and
   generating a time-domain signal for transmission based on an M-point inverse FFT (IFFT) of the mapped M subcarriers.

2. The method according to claim 1, wherein the N-symbol transmission vector is a time domain array for transmission over a communication channel.

3. The method according to claim 1, wherein mapping the results of the interleaving union to the M subcarriers is performed in one of a localized manner and a distributed manner.

4. The method according to claim 1, further comprising transmitting the generated time-domain signal over a wireless communication technology that utilizes one of: frequency division multiple access (FDMA), orthogonal frequency division multiple access (OFDMA), or a narrow band allocation technology.

5. The method according to claim 1, further comprising assigning, to each end user device of L end user devices, the N subcarriers out of M=N*L available subcarriers.

6. The method according to claim 5, further comprising setting, after the assignment of the N subcarriers to each end user device of the L end user devices, remaining subcarriers of the M subcarriers to substantially zero.

7. A method to provide tunable peak-to-average power ratio (PAPR) frequency division multiplexing for reception in a communication network, the method comprising:
   performing analog-to-digital conversion (ADC) on a received signal that is encoded with a tunable PAPR frequency division multiplex technique;
   performing a fast Fourier transform (FFT) operation on the converted signal followed by an equalization operation, to obtain FFT results;
   de-mapping N subcarriers of the FFT results from M subcarriers, to obtain de-mapping results;
   performing an interleaving partition of the de-mapping results such that each subcarrier of the N subcarriers includes information of N/k symbols, wherein k is an integer value between 1 and N, and wherein k is selected based on an acceptable value of the PAPR at a receiver;
   performing an inverse FFT (IFFT) operation of size N/k on each interleaving partition result, to obtain IFFT results; and
   performing symbol detection on the IFFT results.

8. The method according to claim 7, wherein de-mapping the N subcarriers of the FFT results from the M subcarriers comprises de-mapping in one of a localized manner and a distributed manner based on a mapping scheme employed in the received signal.

9. The method according to claim 7, further comprising performing a cyclic prefix removal operation on the M subcarriers.

10. The method according to claim 7, wherein performing the ADC on the received signal comprises performing the ADC on a signal received over the communication network, which employs a wireless communication technology and which utilizes one of: frequency division multiple access (FDMA), orthogonal frequency division multiple access (OFDMA), or a narrow band allocation technology.

11. The method according to claim 7, further comprising assigning, to each end user device of L end user devices, the N subcarriers out of M=N*L available subcarriers.

12. A controller for a communication network configured to employ tunable peak-to-average power ratio (PAPR) frequency division multiplexing, the controller comprising:
   a communication module configured to communicate with a plurality of end user devices; and
   a processor coupled to the communication module, wherein the processor is configured to perform or cause to be performed:
   receive an N-symbol transmission vector;
   select k to obtain a particular PAPR at a receiver, wherein the selection of k is based on an acceptable value of the PAPR at the receiver, and wherein k is an integer value between 1 and N;
   partition the N-symbol transmission vector into k equal partitions;
   perform a fast Fourier transform (FFT) operation of size N/k on each of the k equal partitions;
   generate an interleaving union of k different FFT results, wherein the interleaving union of the k different FFT results comprises N subcarriers, and wherein each of the N subcarriers includes information about N/k symbols;
   map results of the interleaving union to M subcarriers, wherein N is a subset of M; and
   generate a time-domain signal for transmission based on an M-point inverse FFT (IFFT) of the mapped M subcarriers.

13. The controller according to claim 12, wherein the N-symbol transmission vector is a time domain array for transmission over a communication channel.

14. The controller according to claim 12, wherein the processor is further configured to perform or cause to be performed:

scale results of the FFT operation with a factor of square root of k in order to equalize an energy of a transmission signal.

15. The controller according to claim 12, wherein each end user device of L end user devices is assigned the N subcarriers out of M=N*L available subcarriers.

16. The controller according to claim 12, wherein to map the results of the interleaving union to the M subcarriers, the processor is configured to perform or cause to be performed:
employ one of a localized mapping and a distributed mapping.

17. The controller according to claim 12, wherein the communication network is configured to employ a communication technology that utilizes one of: frequency division multiple access (FDMA), orthogonal frequency division multiple access (OFDMA), or a narrow band allocation technology.

18. The controller according to claim 15, wherein the processor is further configured to perform or cause to be performed:
set, after the assignment of the N subcarriers to each end user device of the L end user devices, remaining subcarriers of the M-subcarriers to substantially zero.

19. The controller according to claim 12, wherein the controller is part of one of a base station and an end user device.

20. The controller according to claim 12, wherein the communication network includes one of: an evolved universal mobile telecommunications system terrestrial radio access network (EUTRAN), a long term evolution (LTE) network, or an LTE-advanced network.

21. An end user device to provide tunable peak-to-average power ratio (PAPR) frequency division multiplexing for reception in a communication network, the end user device comprising:
a memory configured to store instructions; and
a processor coupled to the memory, wherein the processor is configured to execute the instructions to perform or cause to be performed:
analog-to-digital conversion (ADC) on a received signal that is encoded with tunable PAPR frequency division multiplex technique;
a fast Fourier transform (FFT) operation on M subcarriers of the converted signal, to obtain FFT results;
a de-map of N subcarriers of the FFT results from the M subcarriers, to obtain de-mapping results;
an interleaving partition of the de-mapping results such that each subcarrier of the N subcarriers includes information of N/k symbols, wherein k is an integer value between 1 and N, and wherein k is selected based on an acceptable value of the PAPR at the end user device;
an inverse FFT (IFFT) operation of size N/k on each interleaving partition result, to obtain IFFT results; and
symbol detection on the IFFT results.

22. The end user device according to claim 21, wherein to de-map the N subcarriers of the FFT results from the M subcarriers, the processor is configured to execute the instructions to perform or cause to be performed:
employ one of a localized de-mapping and a distributed de-mapping, based on a mapping scheme employed by a transmitter.

23. The end user device according to claim 21, wherein the communication network is configured to employ a communication technology that utilizes one of: frequency division multiple access (FDMA), orthogonal frequency division multiple access (OFDMA), or a narrow band allocation technology.

24. The end user device according to claim 21, wherein the communication network includes one of an evolved universal mobile telecommunications system terrestrial radio access network (EUTRAN), a long term evolution (LTE) network, an LTE-advanced network, a high speed packet access (HSPA) network, or an advanced HSPA network.

25. A non-transitory computer-readable storage medium with instructions stored thereon to provide tunable peak-to-average power ratio (PAPR) frequency division multiplexing for transmission in a communication network, wherein the instructions, in response to execution by a processor, cause the method of claim 1 to be performed.

26. A non-transitory computer-readable storage medium with instructions stored thereon to provide tunable peak-to-average power ratio (PAPR) frequency division multiplexing for reception in a communication network, wherein the instructions, in response to execution by a processor, cause the method of claim 7 to be performed.

* * * * *